United States Patent [19]

Yagino

[11] Patent Number: 4,947,183

[45] Date of Patent: Aug. 7, 1990

[54] EDGE TYPE THERMAL PRINTHEAD

[75] Inventor: Masanori Yagino, Toyonaka, Japan

[73] Assignee: Ricoh Company, Ltd., Tokyo, Japan

[21] Appl. No.: 270,784

[22] Filed: Nov. 14, 1988

[30] Foreign Application Priority Data

Nov. 14, 1987 [JP] Japan .............................. 62-174338
Nov. 14, 1987 [JP] Japan .............................. 62-287922

[51] Int. Cl.[5] ............................................ G01D 9/00
[52] U.S. Cl. ............................... 346/76 PH; 219/216; 400/120
[58] Field of Search ............ 346/76 PH; 219/216 PH; 400/120 PH

[56] References Cited

U.S. PATENT DOCUMENTS 4,810,852 3/1989 Bakewell ........................ 346/76 PH

*Primary Examiner*—George H. Miller, Jr.
*Assistant Examiner*—Huan Tran
*Attorney, Agent, or Firm*—Cooper & Dunham

[57] ABSTRACT

A duplex edge type thermal printhead assembly includes a pair of top and bottom substrates each of which is provided with a plurality of top and bottom heat-producing elements arranged in the form of an array on its main surface. The top and bottom substrates are fixedly attached together with their main surfaces facing each other so that the top and bottom electrodes are alternately arranged at an equal interval to define an integrated array of heat-producing elements. An edge type thermal printhead assembly in accordance with another aspect of the present invention includes a substrate having a main surface and an end surface and a heat insulator region formed from a glass glaze material at a corner between the main and end surfaces. An array of heat-producing elements is formed on a surface portion of the heat insulator region which is coplanar with the main surface of the substrate.

23 Claims, 10 Drawing Sheets

EDGE TYPE THERMAL PRINTHEAD

BACKGROUND OF THE INVENTION

1. Field of the Invention

This invention generally relates to a thermal printhead suitable for use in facsimile machines and printers, such as video printers and handy printers, and, in particular, to an edge type thermal printhead having a plurality of heat-producing (resistor) elements formed in the form of a single array at one end surface thereof.

2. Description of the Prior Art

FIG. 1 schematically illustrates the main portion of a conventional edge type thermal printhead. As shown, the edge type thermal printhead includes a substrate 1 typically comprised of alumina ceramics and serving also as a heat sink. A glass glaze layer 2 is formed at the bottom end surface of the substrate 1 as a heat insulator, and an array of heat-producing elements or resistor elements 3 is formed on the glass glaze layer 2. Electrodes 4 and 5 for passing current to the array of heat-producing elements 3 selectively are also formed on the substrate 1. Typically, a protective layer is formed on the array of heat-producing elements 3, but such a protective layer is omitted in FIG. 1. Such an edge type thermal printhead has the following advantages.

(1) An excellent contact between a recording medium and the thermal printhead may be achieved, and the surrounding input device may be simplified.

(2) Since the array of heat-producing elements 3 are provided in the form of projections at the end surface of the substrate 1, a uniform contact pressure with a recording medium and/or an ink ribbon may be easily attained, and, in particular, a printed image of high quality may be attained in a transfer type thermal recording system in which use is made of a heat-sensitive ink ribbon.

(3) Printing may be easily effected on a plate-shaped recording medium.

(4) A multi-thermal printhead for use in color printing may be easily implemented.

(5) The diameter of a platen roller may be set independently of the outer shape of the substrate 1.

However, in such an edge type thermal printhead, since the array of heat-producing elements 3 is formed at an end surface of the substrate 1, it has various disadvantages as will be enumerated below. (i) Since heat-producing elements are formed on an end surface of a substrate, only two rows of such heat-producing elements may be formed. For this reason, surface-to-surface contact mounting cannot be effected and it is not suited for mass production. (ii) An end surface of a substrate must be subjected to glass glaze processing, which is technically difficult and high at cost. (iii) A pattern of the heat-producing elements 3 and the electrodes 4 and 5 must be formed extending between an end surface and a side surface over an edge. Difficulty will be encountered in resist application, photomask formation and exposure, and the number of steps in the formation of such a pattern will be increased.

SUMMARY OF THE INVENTION

In accordance with one aspect of the present invention, there is provided a duplex edge type thermal printhead including a first substrate having a first main end surface, a first array of heat-producing elements formed on said first substrate along said first main surface, a second substrate having a second main end surface, a second array of heat-producing elements formed on said second substrate along said second main end surface, whereby said second subtrate is fixedly attached to said first substrate with said second end surface being aligned with said first end surface such that the heat-producing elements of said first and second arrays are alternately arranged at an equal interval.

In accordance with another aspect of the present invention, there is provided a edge type thermal printhead which includes a substrate having a main side surface and a main end surface, a heat insulator portion formed at least at a corner between said main side and end surfaces, and an array of heat-producing (resistor) elements formed on said heat insulator portion extending along said main end surface. A recording medium, such as photosensitive paper in the case of direct thermal recording type or plain paper in the case of transfer thermal recording type using a heat-sensitive ink ribbon, is passed in a direction substantially perpendicular to the main side surface in sliding contact with the main end surface. Thus, when heat pulses are selectively applied to the array of heat-producing elements in accordance with an image signal, a heat pattern is defined by the selective activation of the heat-producing elements, and this heat pattern is applied to the recording medium through the heat insulator so that an image may be printed on the recording paper thermally.

In accordance with a further aspect of the present invention, there is provided a duplex edge type thermal printhead including a first substrate having a first main side surface and a first main end surface, a first heat insulator portion formed at a corner between said first main side and end surfaces, a first array of heat-producing elements formed on said first heat insulator portion, a second substrate having a second main side surface and a second main end surface, a second heat insulator portion formed at a corner between said second main side and end surfaces, a second array of heat-producing elements formed on said second heat insulator, whereby said second subtrate is fixedly attached to said first substrate with said first main side surface facing said second main side surface and said second end surface being aligned with said first end surface such that the heat-producing elements of said first and second arrays are alternately arranged at an equal interval.

It is therefore a primary object of the present invention to obviate the disadvantages of the prior art as described above and to provide an improved edge type thermal printhead.

Another object of the present invention is to provide an improved edge type thermal printhead high in resolution, easy to manufacture and thus low at cost.

A further object of the present invention is to provide an improved edge type thermal printhead compact in size and high in performance.

A still further object of the present invention is to provide an edge type thermal printhead suitable for use in facsimile machines and printers of various types.

A still further object of the present invention is to provide an improved edge type thermal printhead which may be used not only for direct thermal printing type using photosensitive paper, but also for transfer thermal printing type using plain paper and a heat-sensitive ink ribbon.

Other objects, advantages and novel features of the present invention will become apparent from the following detailed description of the invention when considered in conjunction with the accompanying drawings.

DESCRIPTION OF THE PREFERRED EMBODIMENTS

Figure 1:
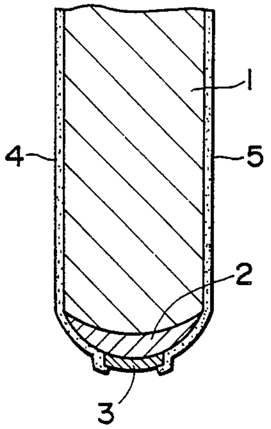
Fig. 1 Prior Art
FIG. 1 is a schematic illustration showing the main portion of a typical prior art edge type thermal printhead.
Figure 2:
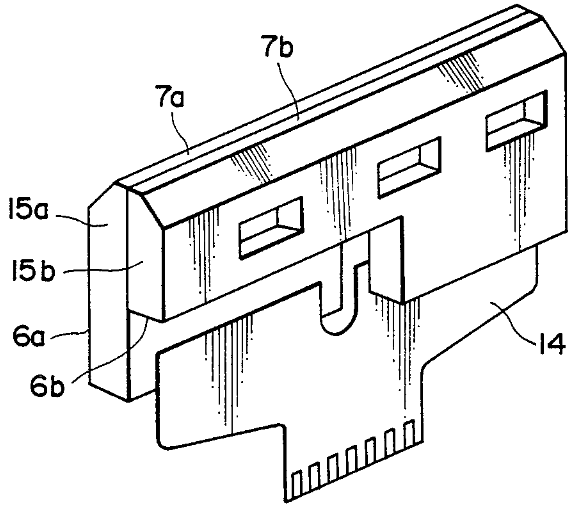
FIG. 2 is a schematic illustration showing in perspective view a duplex edge type thermal printhead constructed in accordance with one embodiment of the present invention.
Figure 3A:
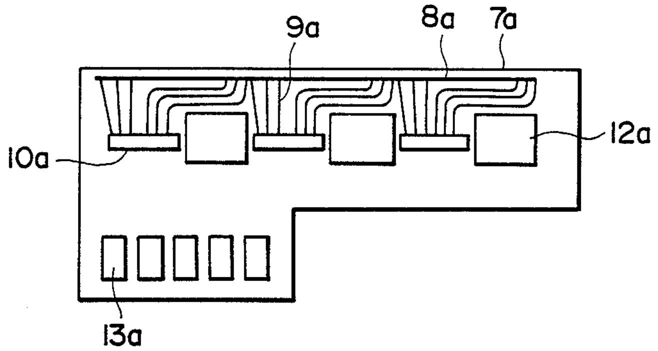
FIGS. 3*a* and 3*b* are schematic illustrations showing in plan view the two sub-assemblies of the duplex edge type thermal printhead of FIG. 2 when taken apart.
Figure 3B:
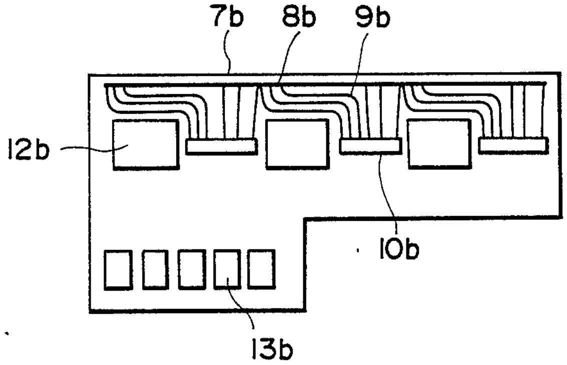
Figure 4:
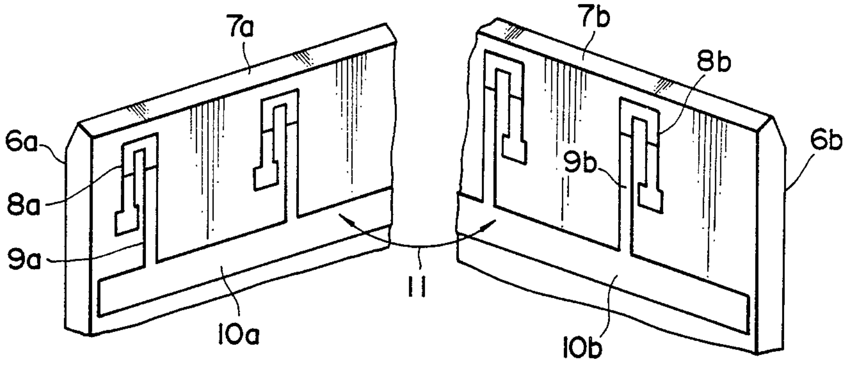
FIG. 4 is a schematic illustration showing how the two sub-assemblies shown in FIGS. 3*a* and 3*b* are combined to define the structure shown in FIG. 2.
Figure 5:
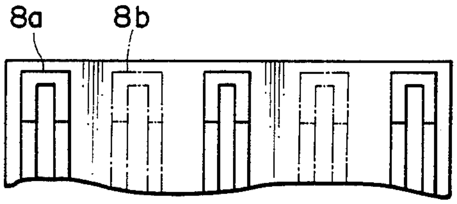
FIG. 5 is a schematic illustration showing the arrangement of a plurality of heat-producing elements in the sub-assembly of the duplex edge type thermal printhead.

Referring now to FIG. 2, there is schematically shown a duplex edge type thermal printhead assembly constructed in accordance with one embodiment of the present invention. FIGS. 3*a* and 3*b* show the two sub-assemblies of the thermal printhead assembly of FIG. 2 when taken apart. FIG. 4 illustrate how the two sub-assemblies are combined to define the thermal printhead shown in FIG. 2, and FIG. 5 illustrates the arrangement of a plurality of heat-producing elements on each of the sub-assemblies.

As shown in FIG. 2, the present duplex edge type thermal printhead includes a pair of substrates 6*a* and 6*b* which are put together with their main surfaces on which heat-producing elements are formed facing each other and their main end surfaces aligned. The substrates 6*a* and 6*b* are preferably comprised of a wear-resistant and heat-resistant material, such as alumina ceramics or hard glass, and they are fixedly attached together to define an integrated structure. As shown in FIGS. 3*a* and 3*b*, the substrates 6*a* and 6*b* are formed with heat-producing (or resistor) elements 8*a* and 8*b*, respectively, arranged along respective main end surfaces or edges. Also formed on the substrates 6*a* and 6*b* are electrodes 9*a* and 9*b* which are electrically connected to the respective arrays of heat-producing elements 8*a* and 8*b*. On the substrates 6*a* and 6*b* are mounted driver ICs 10*a* and 10*b* which are electrically connected to the respective electrodes 9*a* and 9*b* by means of wire bonding, face down bump bonding or a TAB method. The heat-producing elements 8*a* and 8*b* may be comprised of such a material as Ta-$SiO_2$, TaN or NiCr, and the electrodes 9*a* and 9*b* may be comprised of such a material as Al, Au, or NiCr-Au.

As shown in FIG. 4, the heat-producing elements 8*a* and 8*b* are formed on the respective substrates 6*a* and 6*b* arranged along the main end surfaces or edges 7*a* and 7*b* spaced apart from each other at a predetermined pitch. Each of the heat-producing elements 8*a* and 8*b* is formed generally in the shape of "U" with its closed end located closer to the main end surface 7*a* or 7*b*. The U-shaped heat-producing element 8*a* or 8*b* has a first leg which is electrically connected to a common electrode 10*a* or 10*b* formed on the substrate 6*a* or 6*b* and a second leg which is electrically connected to an individual electrode also formed on the substrate 6*a* or 6*b* and having a terminal connected to the associated driver IC 10*a* or 10*b*. Both of the heat-producing elements 8*a* and 8*b* are arranged along the respective main end surfaces spaced apart from each other at a predetermined pitch; however, it should be noted that these heat-producing elements 8*a* and 8*b* are staggered such that they are arranged alternately substantially at an equal interval when these two substrates 6*a* and 6*b* are fixedly attached with their main surfaces on which the heat-producing elements 8*a* and 8*b* are formed facing each other as indicated by the arrow 11 in FIG. 4. In other words, when the two substrates 6*a* and 6*b* are combined to define the present thermal printhead assembly shown in FIG. 2, each of the heat-producing elements 8*a* comes to be located substantially at a center between any two adjacent ones of the heat-producing elements 8*b*. Although now shown specifically, an electrical insulating layer of polyimide or $SiO_2$ is typically formed to cover the heat-producing elements 8*a* and 8*b* and electrodes 9*a*, 9*b*, 10*a* and 10*b* excepting those areas where the terminals for connection to the ICs 10*a* and 10*b* are formed.

Returning to FIGS. 3*a* and 3*b*, the driver ICs 10*a* and 10*b* are arranged on the respective substrates 6*a* and 6*b* in a staggered relationship such that they are not placed one on top of another when the two substrates 6*a* and 6*b* are assembled. The substrates 6*a* and 6*b* are also formed with rectangular openings or through-holes 12*a* and 12*b* located such that each of the openings 12*a* or 12*b* may receive therein the corresponding driver IC 10*a* or 10*b* when the substrates 6*a* and 6*b* are assembled. Accordingly, even if the driver ICs 10*a* and 10*b* are mounted on the respective substrates 6*a* and 6*b*, since they are received in the respective openings 12*a* and 12*b* of the opposite substrates 6*a* and 6*b*, these substrates 6*a* and 6*b* may be brought into a face contact between their main surfaces.

As also best shown in FIGS. 3*a* and 3*b*, each of the substrates 6*a* and 6*b* is formed with a projection which projects from part of the rear end opposite to main end along which an array of heat-producing elements 8*a* or 8*b* is formed. And, a plurality of terminals 13*a* or 13*b* are formed on each of these projections. The terminals 13*a* and 13*b* are electrically connected to the driver ICs 10*a* and 10*b* and the arrays of heat-producing elements 8*a* and 8*b*, respectively, through interconnection pattern and wire bonding or the like. As shown in FIGS. 3*a* and 3*b*, since both of the substrates 6*a* and 6*b* have their projections at the left half, when the substrates 6*a* and 6*b* are assembled as described before, the projections do not face each other and are located on opposite sides with respect to the center of the assembly extending perpendicular to the combined array of heat-producing elements 8*a* and 8*b*.

Typically, the driver ICs 10*a* and 10*b* are of the resin molded type, and use may be made of any of inorganic or organic adhesive for attaching the two substrates 6*a* and 6*b* fixedly each other. However, after having the ICs 10*a* and 10*b* mounted on the respective substrates 6*a* and 6*b*, there is a limitation for the temperature to be used in heat treatment, and thus, it is preferable to use a relatively low temperature adhesive such as silicone, phenol or epoxy family adhesives.

Again, referring to FIG. 2, the main end surfaces 7*a* and 7*b* of the respective substrates 6*a* and 6*b* are appropriately chamfered or beveled since a sheet of recording paper, such as photosensitive paper in the case of the direct thermal printing type, is brought into sliding contact with these main end surfaces 7*a* and 7*b* during a printing operation. The assembly shown in FIG. 2 also includes a flexible print interconnection plate 14 which serves an interface for establishing an electrical connection between the present thermal printhead assembly and an external circuitry. The flexible print interconnection plate 14 is typically formed with electrical conductors on both sides thereof and one end thereof is electrically connected to the terminals 13*a* and 13*b*. Although not shown specifically, it is preferable to provide a heat-dissipating plate on each of the substrates 6*a* and 6*b* so as to dissipate the heat produced by the present thermal printhead assembly into the atmosphere, and such a heat-dissipating plate may also serves as a protective cover plate of the present thermal printhead assembly.

It will now be understood that in accordance with this aspect of the present invention, since a pair of substrates 6*a* and 6*b* are combined to define the integrated duplex edge type thermal printhead assembly, the resolution of the integrated assembly is a double of that of the single sub-assembly. That is, if each of the substrates 6*a* and 6*b* has a resolution or density of heat-producing elements equal to 8 dots/mm, the combined resolution of the integrated assembly will be 16 dots/mm. Thus, the spacing between the two adjacent heat-producing elements on each of the substrates 6*a* and 6*b* may be set relative large during manufacture and thus the sub-assemblies may be manufactured with ease and at high yield. Even if the spacing between the two adjacent heat-producing elements 8*a* and 8*b* of the substrates 6*a* and 6*b* is set to be relatively large in this manner, since the substrates 6*a* and 6*b* are eventually assembled to define an integrated duplex edge type thermal printhead assembly, there can be obtained a sufficiently high resolution or density of heat-producing elements.

Now, a method of manufacturing the present thermal printhead assembly will be described. A pair of substrates 6*a* and 6*b* having a generally L-shaped configuration and formed with a plurality of openings 10*a* and 10*b*, respectively, is provided. Then, in a manner similar to that of manufacturing a conventional planar type thermal printhead assembly, a resistor layer and an electrode layer are formed on each of the substrates 6*a* and 6*b* and then these layers are appropriately patterned, for example, by well-known photolithography to thereby define arrays of heat-producing elements 8*a* and 8*b* and electrode patterns 9*a* and 9*b*. Then, and electrically insulating layer is formed on each of the substrates 6*a* and 6*b* to cover the desired portions of the heat-producing elements 8*a* and 8*b* and the electrode patterns 9*a* and 9*b*. Thereafter, a plurality of driver ICs 10*a* and 10*b* are mounted on the substrates 6*a* and 6*b*, respectively. Use may be made of wire bonding or any other appropriate method in mounting these driver ICs 10*a* and 10*b* on the respective substrates 6*a* and 6*b*. Then, resin molding is effected to each of the driver ICs 10*a* and 10*b*. Then, the two substrates 6*a* and 6*b* are fixedly attached to each other with their main surfaces, on which the driver ICs 10*a* and 10*b* are mounted, facing each other by means of an adhesive such that the arrays of heat-producing elements 8*a* and 8*b* are arranged in a staggered relationship as shown in FIG. 5. Then, the main end surfaces 7*a* and 7*b* of the two substrates 6*a* and 6*b* thus combined are chamfered, and then a flexible printed circuit plate 14 is fixedly attached to the combined substrates 6*a* and 6*b* to establish an electrical connection between the terminals 13*a* and 13*b* and the flexible printed circuit plate 14. A connection between the flexible printed circuit plate 14 and the terminals 13*a* and 13*b* may be established, for example, by thermo-compression bonding, soldering or pressure bonding.

In the case where the substrates 6*a* and 6*b* are transparent, such as hard glass, the staggered or alternate arrangement between the two arrays of heat-producing elements 8*a* and 8*b* as shown in FIG. 5 may be easily established; however, in the case where the substrates 6*a* and 6*b* are opaque, such as ceramics, the two substrates 6*a* and 6*b* are fixedly attached together with their side surfaces 15*a* and 15*b* kept in abutment against a surface plate. In this case, the side surfaces 15*a* and 15*b* are used as reference surfaces in establishing a staggered or alternate arrangement of the combined heat-producing elements 8*a* and 8*b*.

In the above-described embodiment, the substrates 6*a* and 6*b* are formed with rectangularly shaped openings 12*a* and 12*b*; however, these openings 12*a* and 12*b* do not need to be through-holes and and instead they may be formed in the shape of recesses. It is also to be noted that the present invention may be applied to a semiconductor type thermal printhead, in which case a driver circuit is formed integrally with the associated heat-producing elements. And, in such a semiconductor type thermal printhead, since there is formed no protruding component on the substrate, it is not necessary to form openings or recesses in the substrate. It should also be noted that the above-described embodiment relates to a thin film type thermal printhead; however, as an alternative, the present invention may also be applied to a thick film type thermal printhead. Use may be preferably made of RuO in such a thick film type thermal printhead.

Figure 6:
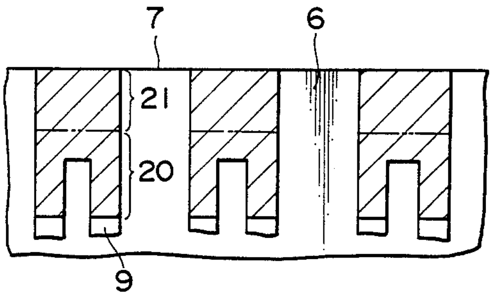
FIGS. 6 through 8 are schematic illustrations showing various examples of heat-producing elements which may be advantageously applied to the duplex edge type thermal printhead.
Figure 7:
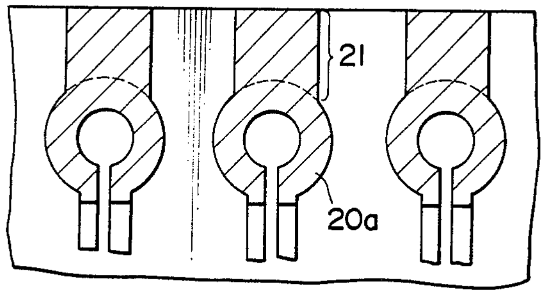
Figure 8:
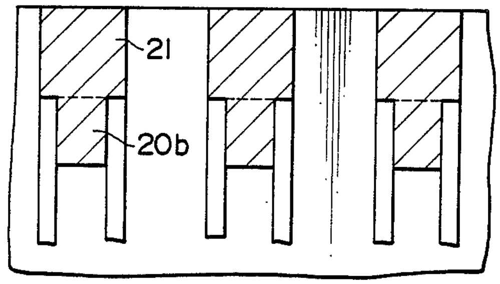

FIGS. 6 through 8 illustrate several examples of heat-producing elements which may be advantageously used in the above-described duplex edge type thermal printhead. The heat-producing element 8 shown in FIG. 6 includes a resistance determining portion 20 which is located slightly away from the edge of the substrate 6 and connected to the electrode 9. The resistance determining portion 20 is disposed at a distance away from the main end surface 7 of the substrate 6, and a heat transmitting path 21 extends from the resistance determining portion 20 to the main end surface 7. In the illustrated embodiment, the heat transmission path 21 and the resistance determining portion 20 are comprised of the same heat-producing or resistor material. Preferably, the material forming the heat-producing element 20 and 21 is relatively high in heat conductivity.

Since the main end surface 7 of the substrate 6 is a surface along which a recording medium is brought into sliding contact during printing operation, and, thus, as the substrate 6 wears, the heat transmission path 21 diminishes. And, since the heat transmission path 21 is exposed at its end surface, it may be oxidized and becomes deteriorated. However, since the resistance of the heat-producing element 8 is determined by the resistance determining portion 20, even if the heat transmission path 21 becomes worn or deteriorated due to oxidization, the resistance of the heat-producing element 8 is not affected and thus the printing performance is not adversely affected. For this purpose, the heat transmission path 21 is preferably set to have a length ranging from several microns to several hundreds microns. In general, since a thermal printhead is driven by a constant voltage, the resistance determined by the resistance determining portion 20 remains unchanged, so that no fluctuations in recording density result. On the other hand, if the heat transmission path 21 becomes too long, the thermal efficiency decreases and blurring in printing would occur. Thus, the above-described range of lengths is preferred.

FIG. 7 illustrates an example in which the resistance determining portion 20*a* is formed in the shape of a ring and FIG. 8 illustrates an example in which the resistance determining portion 20*b* is formed in the shape of a rectangle. It is to be noted that any of the heat-producing elements as shown in FIGS. 6 through 8 may be advantageously applied to the present thermal printhead assembly shown in FIG. 2. The heat-producing elements may also be applied to thick film type or semiconductor type thermal printheads other than the thin film type thermal printhead as described above. In the case of these heat-producing elements shown in FIGS. 6 through 8, even if a mechanical damage, such as cracks, occurs in the sliding end surface of the substrate, it does not adversely affect the resistance of each of the heat-producing elements. Besides, even if the resistance determining portion 20 is trimmed for adjustments in the resistance value, such trimming would not adversely affect the printing performance.

As described above, in accordance with this aspect of the present invention, an array of resistor or heat-producing elements is formed on the main surface of a substrate along a main end surface thereof, and two of such substrates are fixedly attached each other in a face-to-face relation with their main surfaces in contact such that the heat-producing elements of the two substrates are alternately arranged in an integrated array at an equal interval. Thus, the resulting duplex edge type thermal printhead will have a resolution double the resolution of the array of heat-producing elements formed on a single substrate. Accordingly, the spacing between the two adjacent heat-producing elements in a substrate may be set at a relatively large value, the array of heat-producing elements may be formed on the substrate relatively easily and at high yield. Moreover, upon mounting of driver ICs on the substrates, only those substrates or sub-assemblies which are functional and operative as intended are selected and assembled to form a duplex edge type thermal printhead assembly, so that the yield may be maintained at a high level. Thus, a high density thermal printhead having an increased number of heat-producing elements per unit length can be manufactured without lowering the yield in patterning and assembling.

In the case of thermal printheads having driver ICs, since the pitch of bonding connections between the driver ICs and the electrodes may be set twice the pitch of the heat-producing elements, a high density or high resolution thermal printhead can be manufactured with ease. For example, the upper limit in mass production is 10 micron pitch for wire bonding and 60 micron pitch for TAB method, and, thus, in accordance with the prior art method, the resolution is limited to 10-16 dots/mm; on the other hand, in accordance with the present invention, a resolution as high as 20-32 dots/mm can be realized. It should also be noted that, in accordance with the present invention, it is not by all means necessary to form a wear-resistance layer overlying the array of heat-producing elements.

Another aspect of the present invention in which an edge type thermal printhead having a heat insulator portion formed in a substrate will now be described. First, referring to FIG. 9, there is schematically shown an edge type thermal printhead constructed in accordance with one embodiment of this aspect of the present invention. FIG. 10 illustrates in plan view the edge type thermal printhead shown in FIG. 9. As shown, the present edge type thermal printhead includes a substrate 36 which is preferably comprised of alumina ceramics and which also severs as a heat sink or heat-dissipating body. The substrate 36 is generally plate-shaped and has a main surface on which an array of heat-producing or resistor elements is formed and a main end surface with which a sheet of recording medium is brought into sliding contact during printing operation. A recess is formed at a corner between the main surface and the main end surface of the substrate 36 and a heat insulator portion 37 is formed in the recess in the shape of glass glaze. Thus, the heat insulator portion 37 is partly exposed at the main end surface of the substrate 36 and thus defines part of the main end surface of the substrate 36 which is ground or polished to define a curved and smooth contact surface. The heat insulator portion 37 is preferably mirror-finished, for example, by lapping to define a top surface substantially coplanar with the main surface of the substrate 36. A plurality of heat-producing or resistor elements 38 are formed spaced apart from each other substantially at an equal interval in the form of a single array on the top surface of the heat insulator portion 37. A pair of electrodes 39and 40 is also formed on the substrate 36 for each of the plurality of heat-producing elements 38.

Figure 9:
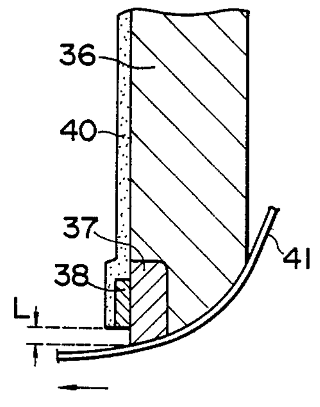
FIG. 9 is a schematic illustration showing in cross section an edge type thermal printhead constructed in accordance with one embodiment of the present invention.
Figure 10:
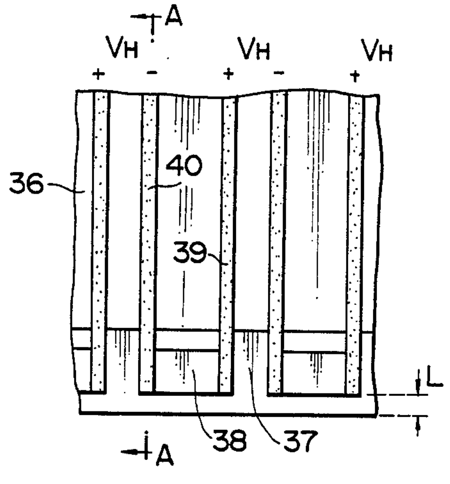
FIG. 10 is a schematic illustration showing in plan view the edge type thermal printhead of FIG. 9.

In the present embodiment, each of the heat-producing elements 38 is formed on the top surface of the heat insulator portion 37 such that the tip end of the heat-producing element 38 is retracted or spaced apart from the edge or main end surface of the substrate 36 over a distance L as indicated in FIGS. 9 and 10. As shown in FIG. 9, a sheet of recording medium, such as heat-sensitive paper or plain paper, 41 is brought into sliding contact with the curved main end surface of the substrate 36, so that the sheet of recording medium 41 is also partly in sliding contact with the heat insulator portion 37. Heat pulses or drive current pulses are selectively applied to the plurality of heat-producing elements 38, and, when activated, the heat-producing element 38 produces heat which is then transmitted to the sheet of recording medium 41 through the corresponding section of the heat insulator portion 37. As a result, the heat insulator portion 37 serves not only as a heat insulator of the heat-producing element 38, but also as a heat transmission region and a wear-resistance region. It may be easily understood that the thickness of the heat insulator portion 37 in the direction perpendicular to the main surface of the substrate 36 determines the size of a pixel, in particular the length of a dot to be printed.

Figure 11:
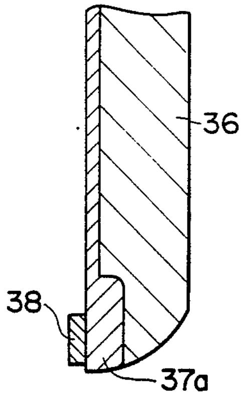
FIGS. 11 through 13 are schematic illustrations showing in cross section various examples of the heat insulator portion suitable for use in the present edge type thermal printhead.
Figure 12:
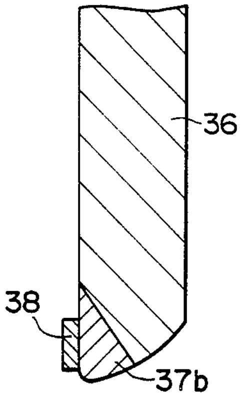
Figure 13:
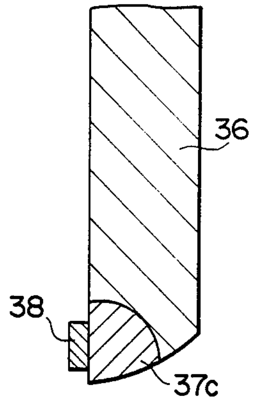
Figure 14:
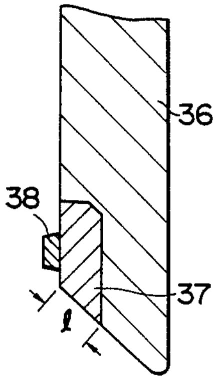
FIGS. 14 through 17 are schematic illustrations showing in cross section various examples of the edge shape of the substrate suitable for use in the present edge type thermal printhead.
Figure 15:
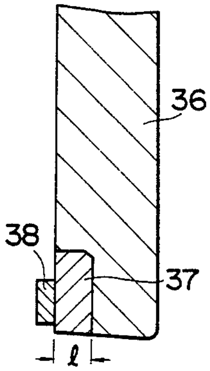
Figure 16:
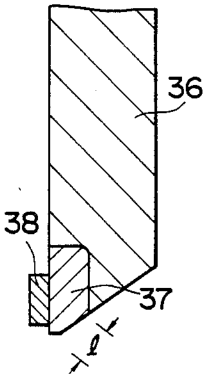
Figure 17:
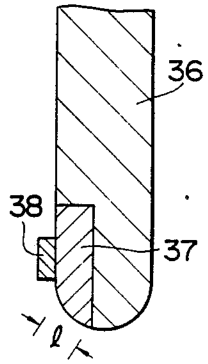

FIGS. 11 through 13 illustrate a few examples of the heat insulator portion 37 which may be used in the present edge type thermal printhead. As described above, in the present embodiment, since the thickness of the heat insulator portion 37 determines the size of a dot to be printed, it is important to control the thickness of the heat insulator portion 37. FIG. 11 illustrates the case in which a glass glaze or heat insulator portion 37*a* is formed across the main surface of the substrate 36 and the heat insulator portion 37*a* is made thicker at the corner between the main surface and the main end surface of the substrate 36. FIGS. 12 and 13 show examples in which heat insulator portions 37*b* and 37*c* are formed only locally at the corner between the main surface and the main end surface of the substrate 36, respectively. In the examples shown in FIGS. 12 and 13, the heat insulator portion 37*b* or 37*c* is formed such that the thickness of the heat insulator portion 37*b* or 37*c* becomes larger toward the main end surface. FIGS. 14 through 17 illustrate several examples of variously shaped main end surfaces of the substrate 36 which are rearwardly slanted, flat cut, forwardly slanted and rounded, respectively. In this manner, the main end surface of the substrate 36 may be formed in any desired shape even other than those or a combination of those shown in Figs. 14 through 17 in consideration of the kind of ink ribbon or recording medium used and associated components, such as platen roller or drum. In each of the cases shown in FIGS. 14 through 17, the thickness or length 1 indicates the length of a dot to be printed.

Figure 18A:
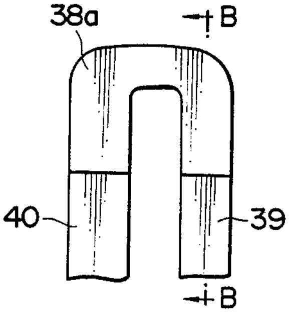
FIG. 18*a* is a schematic illustration showing in plan view another example of a heat-producing element suitable for use in the present thermal printhead.
Figure 18B:
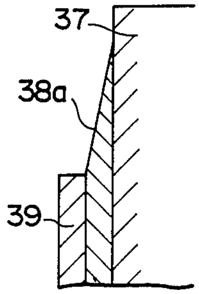
FIG. 18*b* is a schematic illustration showing the cross section of the structure shown in FIG. 18*a* taken along line B—B.
Figure 19:
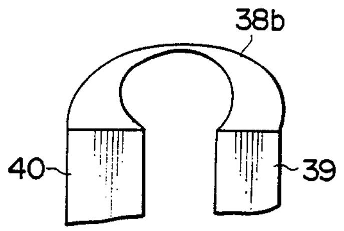
FIGS. 19 and 20 are schematic illustrations showing other examples of a heat-producing element suitable for use in the present thermal printhead.
Figure 20:
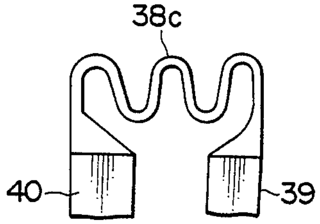

FIGS. 18*a*, 18*b*, 19 and 20 illustrate various possible shapes of the heat-producing element 38 which may be advantageously used in the present edge type thermal printhead. The heat-producing element 38 is formed on the heat insulator portion 37 in the vicinity of the main end surface of the substrate 36, and it must be so formed to define a heat distribution which causes the heat thus produced to flow preferentially toward the main end surface of the substrate 36. In the thermal printhead shown in FIG. 10, the heat-producing element 38 is rectangular in shape and heat dissipation is effected through the electrodes 39 and 40 so that the heat produced by the element 38 has a tendency to flow toward the main end surface of the substrate 36. FIGS. 18*a* and 18*b* illustrate a heat-producing element 38*a* which is made gradually thinner toward the main end surface of the substrate 36. FIG. 19 illustrates an example in which a heat-producing element 38*b* is made gradually narrower toward the center, and FIG. 20 illustrates an example in which a heat-producing element 38*c* is comprised of a narrow serpentine-like strip.

It is to be noted that, unlike a conventional structure which requires the provision of a wear-resistant layer overlying an array of heat-producing elements, this aspect of the present invention does not call for the provision of such a wear-resistant layer since a sheet of recording medium 41 is brought into sliding contact only with the substrate 36 and the heat insulator portion 37 and not with an array of heat-producing elements 38. Thus, the substrate 36 and the heat insulator portion 37 also serve as a wear-resistant layer. The above-described embodiment of this aspect of the present invention is the case in which use is made of a thin film heat-producing or resistor element; alternatively, the present invention can also be applied to an edge type thermal printhead using an array of thick film heat-producing or resistor elements, if desired.

Figure 21:
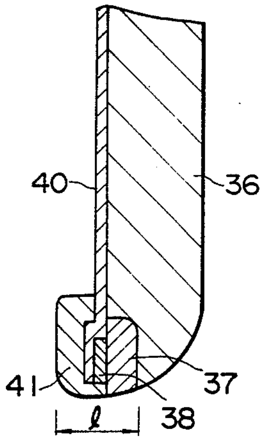
FIGS. 21 and 22 are schematic illustrations showing in cross section preferred embodiments of the present edge type thermal printhead.
Figure 22:
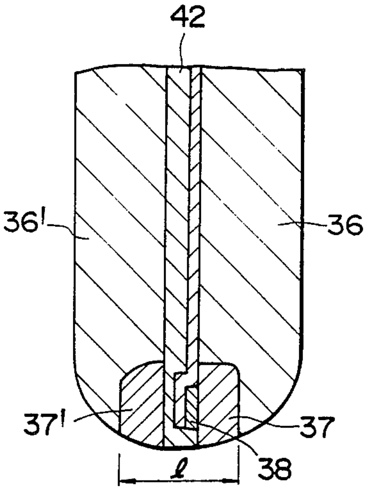

Preferably, a heat insulator layer (or portion) is also provided on top of the heat-producing element 38. FIG. 21 illustrates an embodiment in which another heat insulator layer 41 of polyimide glass paste is provided on top of the heat-producing element 38. FIG. 22 shows another embodiment in which a second substrate 36′ provided with a heat insulator portion 37′ at its front edge is placed on and fixedly attached to the edge type thermal printhead of FIG. 9 with an adhesive layer 42 in between to define a sandwiched edge type thermal printhead assembly. As the adhesive agent 42, use may for example be made of a heat-resistant, inorganic adhesive agent. In the embodiments shown in FIGS. 21 and 22, since the heat insulator regions 37 and 41 in FIG. 21 and 37 and 37' in FIG. 22, respectively, are provided on top and bottom of the heat-producing element 38, the total length 1 of the combined heat insulator regions 37 and 41 in the case of FIG. 21 and 37 and 37' in the case of FIG. 22 is approximately twice the length 1 of the embodiment shown in FIG. 9. For this reason, the thickness of each of the heat insulator regions 37, 37' and 41 may be made approximately half of that of FIG. 9. As an example, in the case of facsimile applications where the resolution or printing density is 8 dots/mm, the length 1 of the heat insulator region 37, 37' or 41 is preferably set approximately at 125 microns.

Figure 23:
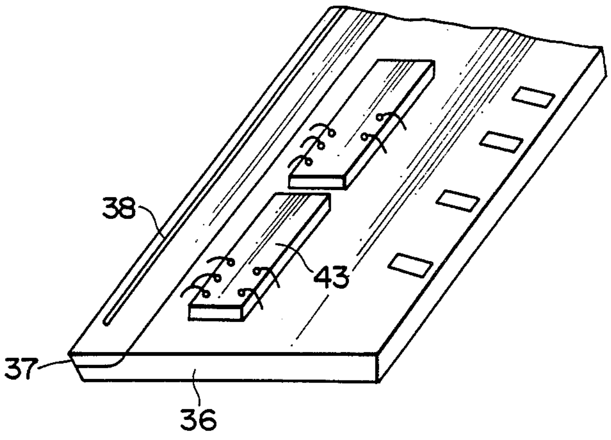
FIG. 23 is a schematic illustration showing in perspective view an edge type thermal printhead including driver ICs constructed in accordance with a further embodiment of the present invention.

FIG. 23 illustrates a modification of the structure shown in FIG. 9 in which driver IC chips 43 are mounted on the substrate 36 in a single array. Drive IC chips 43 are fixedly attached to the substrate 36 by die bonding and a connection between each of the driver IC chips 43 and the electrodes (not shown in FIG. 23) on the substrate 36 is established by wire bonding.

Figure 24:
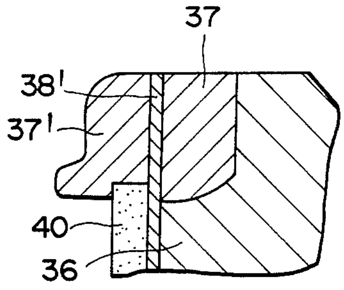
FIGS. 24 and 25 are schematic illustrations showing in cross section other embodiments of the present edge type thermal printhead.

FIG. 24 illustrates another embodiment of the present edge type thermal printhead which may be considered as a modification of the structure shown in FIG. 9. That is, in the structure shown in FIG. 24, a heat-producing element 38' extends up to the main end surface of the substrate 36 and thus the tip end of the heat-producing element 38' is flush with the main end surface defined by the heat insulator region 37 and the substrate 36. In this case, since the tip end of the heat-producing element 38' is exposed at the main end surface of the substrate 36, the heat-producing element 38' comes into direct contact with a sheet of recording medium. In this case, therefore, the thickness of the heat-producing element 38' determines the length of a dot to be printed in the direction perpendicular to the main surface of the thermal printhead. In this embodiment, since the tip end of the heat-producing element 38' is brought into sliding contact with a sheet of recording medium during printing operation, the heat-producing element 38' gradually wears, so that it is preferable to select a material for the heat-producing element 38' such that the amount of wear for the heat-producing element 38' be significantly smaller than that for each of the heat insulator regions 37 and 37', the electrode 40 and the substrate 36. In particular, a selection of materials is effected such that the amounts of wear for the heat insulator regions 37 and 37' and for the electrode 40 are much smaller than that for the substrate 36 and the amount of wear for the heat-producing element 38' is much smaller than those for the heat insulator regions 37 and 37' and the electrode 40. When the heat-producing element 38' is provided with its tip end exposed at the main end surface of the substrate 36, the tip end of the heat-producing element 38' comes into direct contact with a sheet of recording paper and thus the heat produced can be efficiently applied to the sheet of recording paper, such as heat-sensitive paper. Thus, there can be obtained a clear image high in quality. Since the heat transfer efficiency is high in this case, a recorded image of high quality with the application of reduced power can be obtained.

Figure 25:
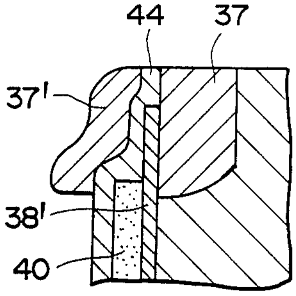

As shown in FIG. 25, a protective layer 44 may be formed from polyimide, solder resist or glass to cover the exposed portions of the heat-producing element 38' and the electrode 40. The heat insulator regions 37 and 37' may be comprised of a resin seal material for IC chips, such as silicone resin, epoxy resin or phenol resin.

Figure 26A:
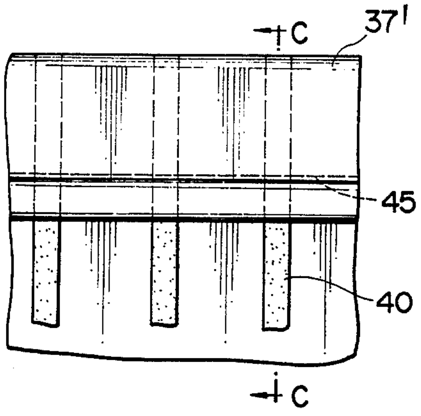
FIG. 26*a* is a schematic illustration showing in plan view an edge type thermal printhead using a thick film resistor as a heat-producing element constructed in accordance with a still further embodiment of the present invention.
Figure 26B:
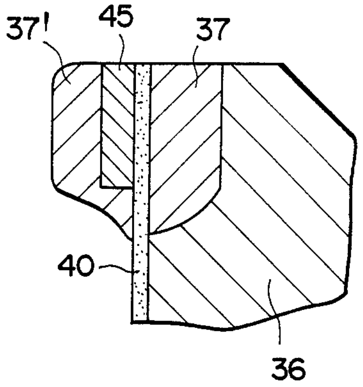
FIG. 26*b* is a schematic illustration showing in cross section the structure of FIG. 26*a* when taken along line C—C.

FIGS. 26a and 26b illustrate an edge type thermal printhead having an array of thick film heat-producing or resistor elements 45 constructed in accordance with a further embodiment of this aspect of the present invention. Typically, the thick film heat-producing elements 45 are constructed in the form of a continuous belt since it is difficult to etch in a minute pattern. Thus, a section of the continuous belt 45 extending between a pair of electrodes 40 defines a bit of heat-producing element. The continuous belt 45 which defines an array of heat-producing elements by intersections with a plurality of electrodes 40 is also exposed at the main end surface of the substrate 36 and the heat insulator region 37.

Figure 27A:
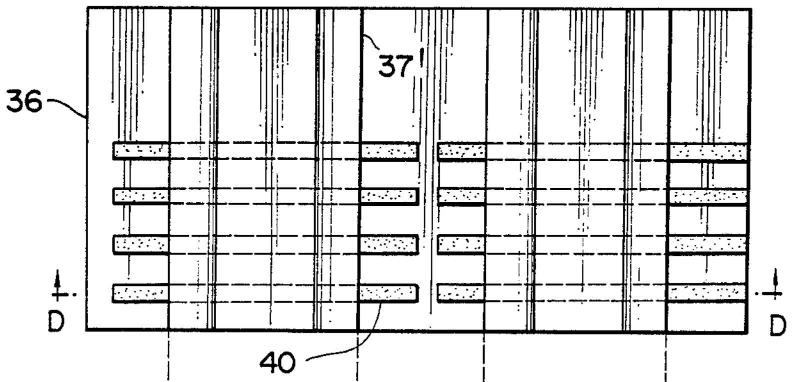
FIG. 27*a* is a schematic illustration showing in plan view a large-sized substrate having formed thereon a plurality of arrays of heat-producing elements at a step in a process for manufacturing an edge type thermal printhead assembly in accordance with one embodiment of the present invention.
Figure 27B:
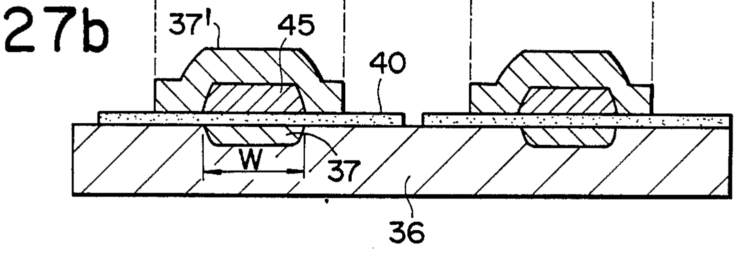
FIG. 27*b* is a schematic illustration showing in cross section the structure of FIG. 27*a* when taken along line D—D.

Now, referring to FIGS. 27a, 27b, 28, 29, 30 and 31, a method for manufacturing an edge type thermal printhead assembly having a thick film heat-producing layer in accordance with one embodiment of this aspect of the present invention will be described. As shown in FIGS. 27a and 27b, there is first prepared a larger-sized substrate 36, for example, of alumina ceramics. The substrate 36 is then formed with a plurality of recesses at its top surface at desired locations and these recesses are then filled with a glass material, which will eventually be formed into a heat insulator portion or region 37, to present a flat even top surface. The recesses are formed to have a depth in the order of 1 to 100 microns. Since the resulting structure will have a thick film heat-producing layer, the width W of the recess is set approximately equal to the width of the heat-producing layer 45, which may be comprised, for example, of RuO. On the other hand, in the case where an array of thin film heat-producing elements is to be formed, for example, a layer of $Ta\text{-}SiO_2$ is formed as a resistor layer across the entire top surface and then a layer of A1 and/or a layer of Cr-Au are formed one on top of another across the entire surface, and, thereafter, these layers are photolithographically etched to define an array of heat-producing elements on the heat insulator region and an electrode pattern.

Figure 28:
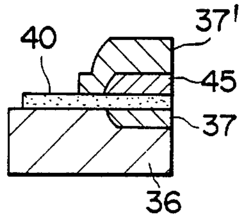
FIG. 28 is a schematic illustration showing in cross section a thermal printhead obtained by cutting the large-sized substrate at the center of each of the arrays of heat-producing elements shown in FIGS. 27*a* and 27*b*.
Figure 29:
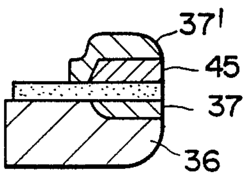
FIG. 29 is a schematic illustration showing in cross section the thermal printhead of FIG. 29 the end surface of which has been subjected to grinding.
Figure 30:
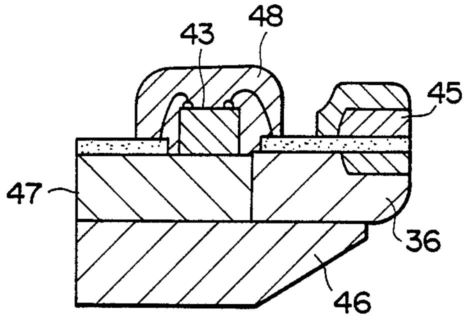
FIG. 30 is a schematic illustration showing the thermal printhead of FIG. 29 when mounted on a base plate.

Then, glass paste is applied in the form of strips or belts to cover the heat-producing belts 45, for example, by a screen printing method to thereby form top heat insulator layers 37'. This completes the layer forming process of the present method. Then, the substrate 36 is cut along the center line of each of the heat-producing layers 45, so that there is obtained an edge type thermal printhead component shown in FIG. 28. When cutting, the substrate 36 may be cut completely, or, alternatively, the substrate 36 may be cut halfway through and then the substrate 36 may be severed by bending. In this case, the substrate 36 may be cut halfway through to define a V-shaped groove or cutting may be effected obliquely. After cutting, the main end surface of the thermal printhead component of FIG. 28 is ground or polished and then chamfered, as shown in FIG. 30. The resulting structure shown in FIG. 29 is then fixedly mounted on a base plate 46 which also serves as a heat sink or heat dissipating body, and a printed circuit board 47 for mounting thereon driver IC chips 43 is also fixedly attached to the base plate 46 adjacent to the thermal printhead component. The base plate 46 may, for example, be comprised of aluminum, stainless steel, alumina ceramics, or iron. The printed circuit board 47 may also be comprised of alumina ceramics so as to make the coefficients of thermal expansion substantially identical. However, use may also be made of an inexpensive board, such as a flexible printed circuit board, a glass epoxy board or a glass plate in place of the printed circuit board 47.

Figure 31:
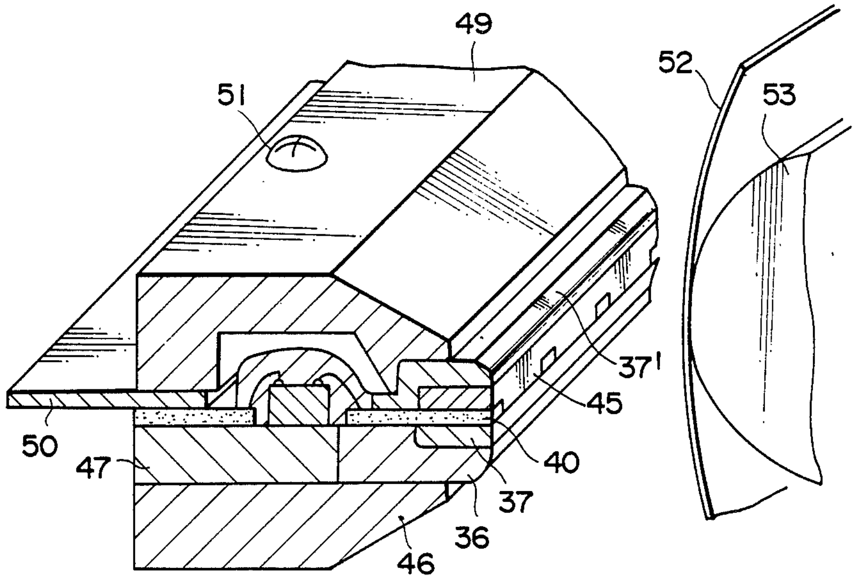
FIG. 31 is a schematic illustration showing in perspective view an edge type thermal printhead assembly which has been completed by mounting a cover plate on top of the structure shown in FIG. 30.

IC chips 43 are mounted on the printed circuit board 47 by die bonding and they are electrically connected to the electrodes formed on the substrate 36 and also on the board 47 by wire bonding. And, then, the IC chips 43 are sealed by a resin material 48. Thereafter, as shown in FIG. 31, a cover or top plate 49 is fixedly attached to the base plate 46 by means of screws 51 with a flexible printed circuit board 50 sandwiched between the printed circuit board 47 and the cover plate 49. In this manner, an edge type thermal printhead assembly is completed and a platen roller 53 is disposed in front of the assembly. A sheet of recording medium, such as photosensitive paper or plate paper, 52 is passed around the platen roller 53 and the sheet of recording medium 52 is pressed against the main end surface of the thermal printhead assembly during printing operation.

In the structure shown in FIG. 30, the printed circuit board 47 is separate from the substrate 36; however, a common substrate may be provided for the substrate 36 and the printed circuit board 47, if desired. In the above-described structure, the IC chips 43 are connected to the associated electrodes by wire bonding; alternatively, the IC chips 43 may be mounted in any other appropriate method, such as face down bonding or TAB method. In the structure shown in FIG. 30, the printed circuit board 47 on which IC chips 43 are mounted is provided separately from the substrate 36 for forming thereon an array of heat-producing elements, and, thus, the depth of the substrate 36 may be set in a range from 1 to 5 mm. Thus, an increased number of such thermal printhead components may be obtained from a fixed size of blank substrate, which would contribute to reduction of cost. It is to be noted that, as a further alternative, for the substrate 36, use may also be made of a metal substrate whose surface is processed to be electrically insulating or a transparent glass substrate, if desired.

Figure 32:
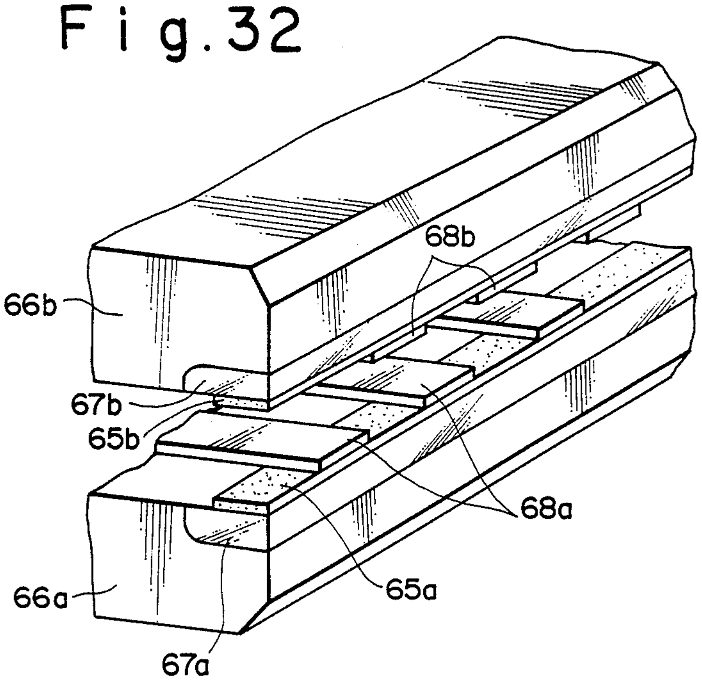
FIGS. 32 and 33 are schematic illustrations showing two examples of the present duplex edge type thermal printheads having heat insulator portions.
Figure 33:
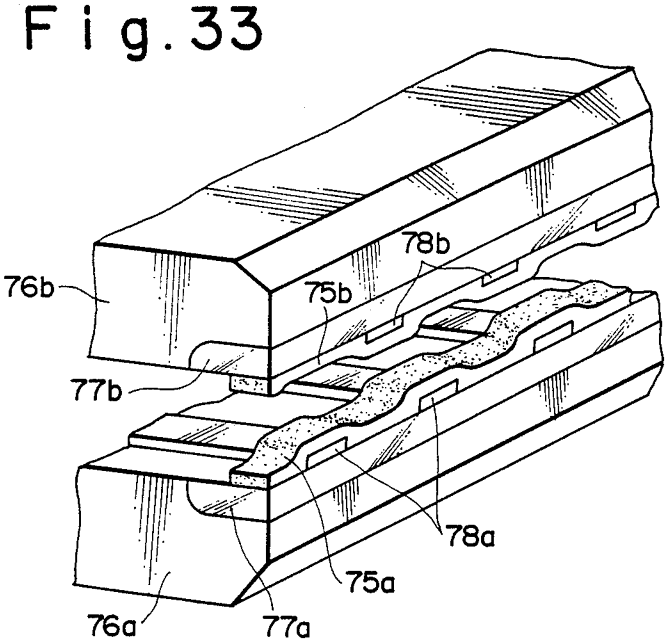

FIGS. 32 and 33 illustrate embodiments which are basically combinations of the previously described two aspects of the present invention. That is, as shown in FIG. 32, the illustrated thermal printhead assembly is of the duplex edge type including a pair of top and bottom thermal printhead sub-assemblies, each of which includes a substrate *66a* or *66b* provided with a heat insulator portion *67a* or *67b* at a corner between the main end surface and the main surface of the substrate *66a* or *66b*. A thick film heat-producing belt *65a* or *65b* is formed on a surface of the heat insulator portion *67a* or *67b* which is coplanar with the main surface of the substrate *66a* or *66b* extending along the main end surface of the substrate *66a* or *66b*. And, a plurality of electrodes *68a* or *68b* are formed on the main surface of the substrate *66a* or *66b* as spaced apart from each other at a predetermined pitch with the tip end of each of the plurality of electrodes *68a* or *68b* substantially flush with the main end surface of the substrate *66a* or *66b*. It should be understood, that the top electrodes *68b* of the top substrate *66b* are arranged in a staggered or alternate relationship with the bottom electrodes *68a* of the bottom substrate *66a*, so that, when the top and bottom substrates *66b* and *66a* fixedly attached together for example by an adhesive, each of the top electrodes *68b* is located midway between the two corresponding adjacent bottom electrodes *68a* of the bottom substrate *66a*. Thus, the resulting thermal printhead assembly will have a resolution double the resolution of each of the sub-assemblies.

FIG. 33 illustrates a further embodiment of the present duplex edge type thermal printhead assembly which is basically similar in many respects to the assembly shown in FIG. 32. As shown, the illustrated duplex edge type thermal printhead assembly includes a pair of top and bottom substrates *76b* and *76a* each of which has a main surface on which a plurality of electrodes *78b* or *78a* are formed and a main end surface. And, each of the substrates *76a* and *76b* is formed with a heat insulator portion *77a* and *77b* at a corner between the main surface and the main end surface. And, a thick film heat-producing layer *75a* or *75b* is formed on a surface of the heat insulator portion *77a* or *77b* which is coplanar with the main surface of the substrate *76a* or *76b* extending along. In this case also, the top electrodes *78b* and the bottom electrodes *78a* are arranged in a staggered or alternate relationship and thus the top and bottom electrodes *78b* and *78a* are alternately arranged at an equal interval when the top and bottom substrates *76b* and *76a* are fixedly attached each other in a face-to-face relationship.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A thermal printhead assembly comprising:

a first substrate having a first main surface and a first main end surface;

a first array of heat-producing elements formed spaced apart from each other at a first predetermined pitch on said first main surface of said first substrate extending along and located close to said first main end surface;

a first electrode pattern formed on said first main surface of said first substrate and electrically connected to said first array of heat-producing elements;

a second substrate having a second main surface and a second main end surface;

a second array of heat-producing elements formed spaced apart from each other at a second predetermined pitch on said second main surface of said second substrate extending along and located close to said second main end surface;

a second electrode pattern formed on said second main surface of said second substrate and electrically connected to said second array of heat-producing elements;

wherein said first and second substrates are fixedly attached together with their first and second main surfaces facing each other and said first and second main end surfaces aligned to define a combined array of said first and second arrays such that the heat-producing elements of said first array and the heat-producing elements of said second array are alternately arranged substantially at an equal interval; and further comprising a first plurality of IC chips mounted on said first surface of said first substrate and a second plurality of IC chips mounted on said second main surface of said second substrate and wherein said first substrate is formed with a second plurality of openings to receive therein said second plurality of IC chips and said second substrate is formed with a first plurality of openings to receive therein said first plurality of IC chips.

2. The assembly of claim 1, wherein said first and second main end surfaces together define a contact surface when aligned to which a sheet of recording medium is brought into contact during printing operation.

3. The assembly of claim 1, wherein said first predetermined pitch is equal to said second predetermined pitch.

4. The assembly of claim 1, wherein said openings are through-holes extending through said first and second substrates.

5. The assembly of claim 1, further comprising a first plurality of terminals formed on said first main surface of said first substrate and a second plurality of terminals formed on said second main surface of said second substrate.

6. The assembly of claim 1, wherein each of said heat-producing elements includes an electrical resistance determining portion located over a predetermined distance from a corresponding one of said first and second main end surfaces and a heat transmission portion extending from said electrical resistance determining portion to said corresponding main end surface.

7. The assembly of claim 1, including a first heat insulator region which is formed on said first substrate, at a corner between said first main surface and said first main end surface and is between at least a part of said first array of heat-producing elements and said first substrate, and a second heat insulator region which is formed on said second substrate, at a corner between said second main surface and said second main end surface and is between at least a part of said second array of heat-producing elements and said second substrate.

8. The assembly of claim 7 in which said first insulator region has a first surface which faces said first array of heat-producing elements and is substantially coplanar therewith and said second insulator region has a second surface which faces said second array of heat-producing elements and is substantially coplanar therewith.

9. A thermal printhead assembly comprising:

a substrate having a main surface and a main end surface;

a heat insulator region formed at a corner between said main surface and said main end surface, said heat insulator region having a first surface substantially coplanar with said main surface of said substrate and a second surface defining part of said main end surface of said substrate;

an array of heat-producing elements formed spaced apart from each other at a predetermined pitch on said heat insulator region; and an electrode pattern formed on said main surface of said substrate and electrically connected to said array of heat-producing elements.

10. The assembly of claim 9, wherein said array of heat-producing elements is separated away from said main end surface over a predetermined distance.

11. The assembly of claim 9, wherein each of said heat-producing elements has a tip end substantially in flush with said main end surface.

12. The assembly of claim 9, wherein said main surface is substantially flat and said main end surface is also flat and substantially at right angles to said main surface.

13. The assembly of claim 9, wherein said main surface is substantially flat and said main end surface is curved.

14. The assembly of claim 9, wherein said main surface is substantially flat and said main end surface is slanted with respect to said flat main surface.

15. The assembly of claim 9, wherein each of said heat-producing elements has a portion which becomes gradually narrower as it extends toward said main end surface.

16. The assembly of claim 9, further comprising an additional heat insulator region formed at least to cover said array of heat-producing elements.

17. The assembly of claim 9, further comprising a plurality of IC chips mounted on said substrate and electrically connected to said electrode pattern.

18. The assembly of claim 9, wherein said array of heat-producing elements is defined by interconnections between a thick film belt extending along said heat insulator region and said electrode pattern.

19. The assembly of claim 9, wherein said heat insulator region is comprised of a glass glaze material.

20. The assembly of claim 9, including a second substrate having a second main surface, a second main end surface and a second heat insulator region which is formed at a corner between said second main surface and said second main end surface and a second array of heat-producing elements formed on said second insulator region and spaced from each other at a second predetermined pitch, wherein said substrate and second substrate are affixed to each other, with said main surface and said second main surface facing each other and with the heat-producing elements of said array and said second array being aligned with each other and alternating along a single composite row.

21. A thermal printhead assembly comprising:

a first substrate having a first inner surface terminating at a first edge, and a second substrate having a second inner surface terminating at a second edge, wherein said first and second inner surfaces face each other and said first and second edges are aligned with each other;

a first insulator region which is formed at said first inner surface, adjacent said first edge, and has a first inner face, and a second insulator region which is formed at said second inner surface, adjacent said second edge, and has a second inner face which is aligned with and faces said first inner face;

a first array of heat-producing elements which is formed at least on said first inner face and a second array of heat-producing elements which is formed at least on said second inner face, wherein the elements of each array are spaced from each other and the elements of the first array alternate with the elements of the second array in a selected direction; and electrodes making electrical contact with said arrays to selectively drive said heat-producing elements thereof to carry out thermal printing.

22. A thermal printhead assembly as in claim 21 in which said first insulator region has a first outer face which is transverse to said inner face thereof and said second insulator region has a second outer face which is transverse to said second inner face, said first and second outer faces forming a composite outer face of said assembly which can contact a medium to carry out thermal printing thereon, and said arrays of heat-producing elements having forward ends which are at said composite outer surface, between said first and second insulator regions.

23. A thermal printhead assembly as in claim 22 in which said first array comprises a first film which is formed on at least a portion of said first inner face and said second array comprises a second film which is formed on said second inner face, each of said films being made of a resistive material to generate heat when electrically energized, and in which said electrodes comprise a first set of electrodes which are formed on said first film and are in electrical contact with both of the first and second films and a second set of electrodes which are formed on said second filme and are in electrical contact with both said first and second films, wherein the electrodes of the first set and of the second set are spaced from each other and alternate with each other in a selected direction to thereby form said first and second arrays of alternating heat-producing elements.

* * * * *